(12) United States Patent
Liukkunen

(10) Patent No.: US 9,222,594 B2
(45) Date of Patent: Dec. 29, 2015

(54) DIRECTIONAL VALVE EQUIPPED WITH PRESSURE CONTROL

(75) Inventor: Tommi Liukkunen, Lempaala (FI)

(73) Assignee: PARKER HANNIFIN MANUFACTURING FINLAND OY, Urjala (FI)

( * ) Notice: Subject to any disclaimer, the term of this patent is extended or adjusted under 35 U.S.C. 154(b) by 193 days.

(21) Appl. No.: 13/994,930

(22) PCT Filed: Jan. 31, 2012

(86) PCT No.: PCT/FI2012/050084
§ 371 (c)(1),
(2), (4) Date: Jun. 17, 2013

(87) PCT Pub. No.: WO2012/104485
PCT Pub. Date: Aug. 9, 2012

(65) Prior Publication Data
US 2013/0276915 A1    Oct. 24, 2013

(30) Foreign Application Priority Data
Feb. 3, 2011 (FI) ....................... 20115108

(51) Int. Cl.
*F16K 31/12* (2006.01)
*F15B 13/04* (2006.01)
*F16K 11/07* (2006.01)

(52) U.S. Cl.
CPC ............. *F16K 31/12* (2013.01); *F15B 13/0402* (2013.01); *F15B 13/0417* (2013.01); *F16K 11/0716* (2013.01); *Y10T 137/7762* (2015.04)

(58) Field of Classification Search
CPC .. F15B 13/0402; F15B 13/0417; F16K 31/12; F16K 11/0716

USPC ......................... 137/625.25, 625.46
See application file for complete search history.

(56) References Cited

U.S. PATENT DOCUMENTS 4,065,921 A    1/1978 Baatrup et al.
5,251,671 A *  10/1993 Hiroki ..................... 137/625.65

(Continued)

FOREIGN PATENT DOCUMENTS

| EP | 0 028 145 A1 | 5/1981 |
|---|---|---|
| EP | 1 184 576 A1 | 3/2002 |
| WO | WO 02/090778 A2 | 11/2002 |

OTHER PUBLICATIONS

International Search Report issued in International Patent Application No. PCT/FI2012/050084 dated May 24, 2012.
Written Opinion issued in International Patent Application No. PCT/FI2012/050084 dated May 24, 2012.

(Continued)

*Primary Examiner* — Craig Schneider
*Assistant Examiner* — Kevin Barss
(74) *Attorney, Agent, or Firm* — Oliff PLC

(57) ABSTRACT

A directional valve for controlling an actuator by a pressurized medium, including: a pressure port; a work port; a tank port; a spool moving axially inside the directional valve; a first position of the spool, in which the spool tends to be set, and a second position, to which the spool can be moved by a pilot control force and in which the spool opens the flow of pressurized medium from the pressure port to the work port. The directional valve further includes a feedback chamber in which the pressure generates a feedback force effective on the spool and opposite to the pilot control force. In its second position, the spool guides the pressure of the work port to the feedback chamber, and in the second position, the directional valve generates a feedback force proportional to the pressure of the work port, moving the spool to shut off the flow.

16 Claims, 3 Drawing Sheets

(56) References Cited

U.S. PATENT DOCUMENTS

| | | | |
|---|---|---|---|
| 5,417,241 A | 5/1995 | Tischer et al. | |
| 5,421,156 A | 6/1995 | Beater et al. | |
| 5,533,334 A * | 7/1996 | Takeuchi et al. | 60/426 |
| 5,560,204 A * | 10/1996 | Ishihama et al. | 60/426 |
| 2002/0101314 A1* | 8/2002 | Oishi et al. | 335/256 |
| 2008/0087435 A1* | 4/2008 | Reddy | 166/343 |

OTHER PUBLICATIONS

International Preliminary Report on Patentability issued in International Patent Application No. PCT/FI2012/050084 dated Mar. 13, 2013.

Nov. 2, 2011 Office Action issued in Finnish Application No. 20115108 (w/ English Translation).

* cited by examiner

DIRECTIONAL VALVE EQUIPPED WITH PRESSURE CONTROL

FIELD OF THE INVENTION

The invention relates to a directional valve for controlling an actuator by means of pressurized medium.

BACKGROUND OF THE INVENTION

In pressurized medium systems, actuators which perform rotary or linear motions, such as motors and cylinders, are utilized in a known manner. In controlling the actuators, valves are utilized for controlling the pressurized medium for example to control the direction of movement of the actuator or to keep it stationary. Different functions of the actuators are implemented by suitable couplings of different valves.

Several different couplings for controlling an actuator are implemented particularly in directional valves comprising a spool which is axially movable in a bore in the valve body and which, in its different positions, couples the different connections and ports of the valves in a desired way. The different channels of the valve are connected to the connections and ports. Typically, the different channels include a pressure port P, one or more work ports, such as a work port A and a work port B, and a tank port T. The actuator is coupled to one or more work ports by means of pipes or hoses.

The spool comprises guide edges which throttle the volume flow. The pressure difference prevailing across the guide edges of the spool, together with the cross-sectional area of the flow (the aperture of the valve), determine the quantity of pressurized medium flowing through the valve, that is, the volume flow from one channel to another. The cross-sectional area of the flow depends on the position of the spool in relation to the valve body and the channels. By the design of the guide edges of the spool, for example various grooves and bevels, it is possible to affect the way in which the cross-sectional area of the flow changes from one position of the spool to another.

The pressure in the work port of the valve may vary as the load of the actuator changes. In particular, there is often reason to limit a pressure increase, for example, to prevent breaking of the pressurized medium system and its components.

Conventionally, pressure control, for example restricting the pressure to a predetermined value, and the lowering of the pressure when it exceeds a predetermined value, is performed by one or more separate pressure valves connected to the control circuit to which the directional valve belongs. The pressure valve is placed, for example, in a line coupled to the work port or pressure port of the directional valve.

According to the prior art, the functions of pressure control and the directional valve can also be combined in the same valve. Publication EP-1184576-A1 discloses a directional valve which also comprises the necessary functional positions for pressure control.

However, the directional valve constructed according to the prior art and also comprising pressure control functions, contains a lot of separate component and is complex in view of manufacture and assembly.

BRIEF SUMMARY OF THE INVENTION

The directional valve according to the invention is presented in claim 1.

In the presented valve solution, particularly new channels and chambers formed in the spool of the valve are utilized, the pressure of the chamber being effective on the spool and adjusting its position.

In comparison with a conventional pilot-controlled directional valve, the difference is now that the pilot control is used to determine the desired maximum pressure of the work port, in addition to the aperture of the valve. In addition to the conventional functions of the directional valve, the spool of the valve is used for pressure control.

In the presented solution, it is possible to eliminate a separate pressure control valve. In the presented solution, a simple spool is utilized, which is placed in a bore in the directional valve, as well as channels in the spool. By means of benching in the spool and the bore, annular surfaces are provided, which are subjected to the pressure that moves the spool, if necessary. Between the annular surfaces of the spool and the bore, a chamber is formed, in which the pressure of the work port is effective in the way of a feedback coupling. By means of the channels in the spool, said chamber is kept in connection with the tank port and/or the work port, depending on the position of the spool. The position of the spool is determined, among other things, by the pilot control and the pressure in said chamber.

By means of the presented solution, there is no need to provide the spool of the directional valve with, for example, movable pistons operating in connection with pressure control.

The solution is, for example, a 4/3 directional valve with four ports for different channels and three functional positions for different couplings of the channels. In addition, the directional valve may, in connection with pressure control, move to two other functional positions in which first the work port connected to the pressure port is closed, and said work port is then connected to the tank port, if necessary.

DESCRIPTION OF THE DRAWINGS

The invention will now be described by means of some examples according to the solution and with reference to the appended drawings, in which.

DETAILED DESCRIPTION OF THE INVENTION

Figure 1:
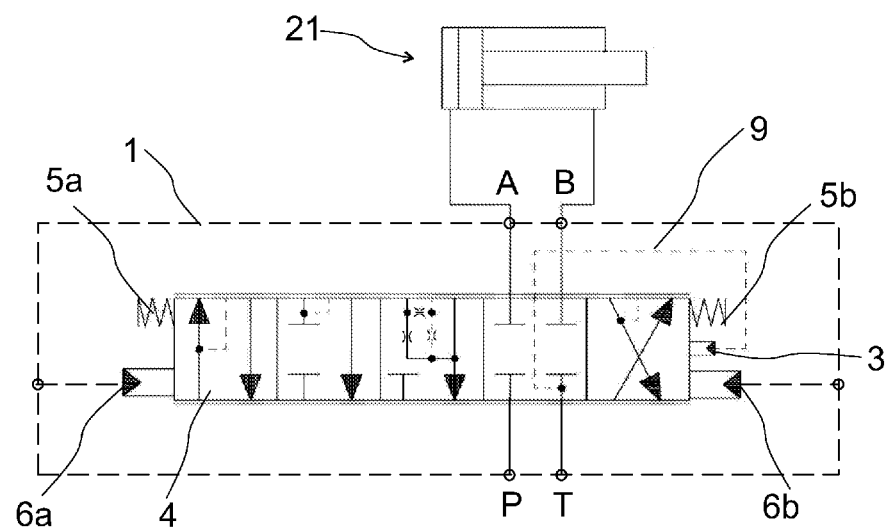
FIG. 1 shows an example of a directional valve according to the solution, illustrated with graphic symbols representing the principles of the different functions of a directional valve.

FIG. 1 shows, by means of graphic symbols of hydraulics and on the principle level, a directional valve in which the pressure control according to the presented solution is applied. In particular, it is a valve suitable for hydraulic oil or various flowing hydraulic fluids.

The valve 1 of FIG. 1 is, in principle, a so-called 4/3 directional valve which also comprises two other functional positions for pressure control. The valve 1 comprises a spool 4 which is arranged, in the centre position of the valve 1 (the second coupling position from the right in FIG. 1), to close a pressure port P, a tank port T, and both work ports A and B. When the valve 1 is not under pilot control, the spool 4 is automatically placed in the centre position, for example by means of springs 5a and 5b. The spool 4 is deviated from the centre position by applying forces generated by the pilot control. The spring force generated by the spring is used as a returning force and a counterforce for the force of the pilot control. Said returning force tends to move the spool to a desired position (e.g. the centre position in FIG. 1), when the pilot control is not in operation.

The pilot control of the valve 1 is effected by means of pressurized medium of the pilot control circuit. For example by means of a pilot control valve, the pressure of the pilot control 6a is led to the spool 4 of the valve in such a way that the force generated by the pilot control pressure moves the spool 4 to a position in which the pressure port P is in connection with the work port A, and the tank port T is in connection with the work port B (the left coupling position in FIG. 1). By means of a second pilot control valve, the pressure of the pilot control 6b is led to the spool 4 of the valve in such a way that the force generated by the pilot control pressure moves the spool 4 in the opposite direction and to a position in which the pressure port P is in connection with the work port B, and the tank port T is in connection with the work port A (the right coupling position in FIG. 1). For example, a motor or a cylinder 21 is coupled to the work ports A and B, wherein the presented valve 1 can be used to change the direction of motion of the actuator.

Those surfaces of the spool 4, on which the different pressures are effective, as well as the springs and the pilot control pressures are adapted and selected such that e.g. a desired balance situation is achieved with respect to the forces, or the spool moves to a desired coupling position, or the spool remains in a desired position. The pressure effective on the spool generates a force which is dependent, among other things, on the structure and the dimensions of the spool. Instead of the pressure, the spool can be subjected to a mechanical force which is generated electrically or by means of pressure.

The pressure port P is coupled to a source that produces pressure and a volume flow, such as a pump, and the tank port T is coupled to an object that receives the volume flow, is pressure-free or has a low pressure level, for example a tank.

According to the example of FIG. 1, if a given pressure of the pilot control 6a is effective on the left end of the spool 4, the spool 4 will open to a given aperture against the spring force of the spring 5b, and the flow will start in the direction P-A to the actuator and from the actuator in the direction B-T, marked by means of the valve channels. Each aperture corresponds to a given cross-sectional area of the flow.

Figure 2:
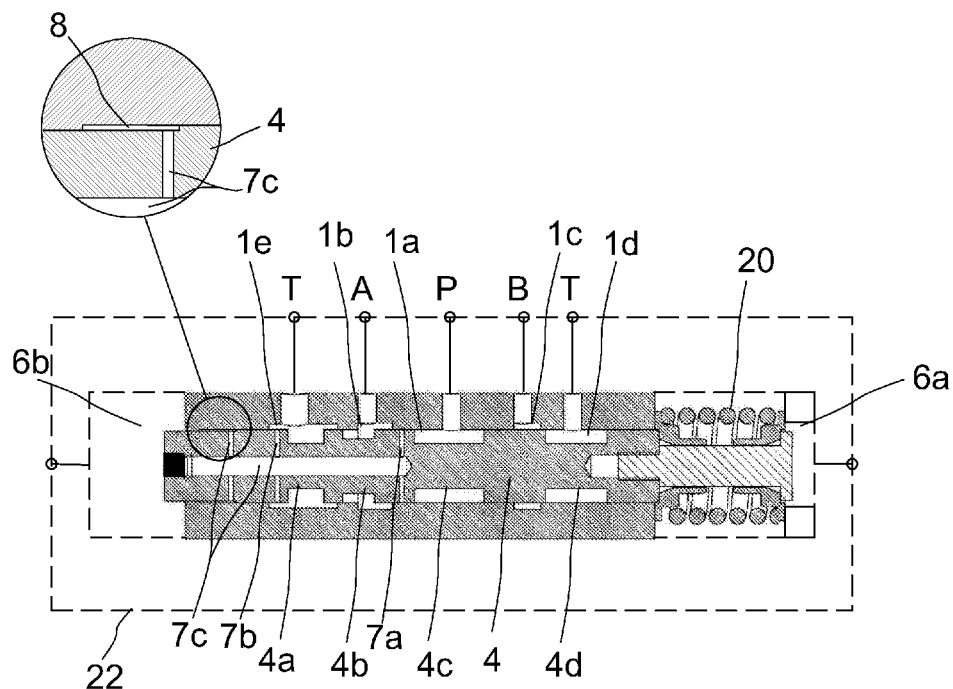
FIG. 2 is a cross-sectional view showing a directional valve according to an example, comprising a feedback chamber and implementing primarily the principles of the functions shown in FIG. 1.

FIG. 1 also shows feedback control 3 and a relating channel 9 which, in a desired way, transmits the pressure of the work port A and/or the pressure of the tank port T when the spool is in different coupling positions. As shown in FIG. 2, the channel 9 is formed by means of the channels 7a, 7b and 7c, and the control 3 is implemented by means of a feedback chamber 8.

In FIG. 1, the valve 1 comprises merely the control ports, to which the pressures needed by the pilot controls 6a and 6b are connected. The valve 1 may belong to a control circuit with separate pilot control valves, from which the necessary pressures are supplied. In an example, the valve 1 further comprises pilot control valves, from which said required pressures are obtained.

In addition, it is possible that instead of a pilot control pressure, the spool 4 is subjected to a mechanical control force corresponding to the force generated by the pilot control pressure. The force is generated e.g. by means of a solenoid controlled by an electric current.

FIG. 2 shows a more detailed view of a directional valve according to an example, and the spool therein. The functions corresponding to FIG. 1 are implemented in the valve 22, so that partly the same reference numerals are used as in the valve 1. To the directional valve, it is possible to couple pilot control pressures to move the spool 4 of the valve 22 into the positions shown in FIG. 1, where the pressure port P is coupled to a work port, in this example either the work port A or the work port B.

The valve 22 comprises a cylindrical spool 4 movable to a desired coupling position in the body of the directional valve. The body comprises a separate, sleeve, inside which the spool 4 is movable. Alternatively, the body comprises a bore in which the spool 4 moves. Accurate fitting between the sleeve and the spool 4 seals the valve 22. In connection with the spool, there is a first chamber 1a which is connected to the pressure port P, a second chamber 1b which is connected to the work port A, a third chamber 1c which is connected to the second work port B, and a fourth chamber 1d which connected to the tank port T. In the same way as in the example of FIG. 2, the valve 22 may comprise a fifth chamber 1e which is connected to the tank port T or to such a chamber (chamber 1d) that is connected to the tank port T. The second and third chambers 1b and 1c are placed on opposite sides of the first chamber 1a. The fourth and the fifth chambers 1d and 1e are located outermost (the fifth and the second chambers 1e and 1b are located next to each other). The chambers are, for example, annular grooves surrounding the spool 4 and placed, for example, around the bore in the body. The chambers can be partly replaced with, for example, shapes or narrowings worked in the spool 4 or the sleeve, as in FIG. 2. The different channels are implemented, for example, by bores.

The spool 4 comprises at least three narrowings 4a, 4b and 4c, and if necessary, also a fourth narrowing 4d, with guide edges of the spool 4 on their both sides. The narrowings are, for example, annular grooves or cuts worked in the spool 4 and encircling the spool. The narrowing can also be formed by cutting one or more grooves or cuts with a flat or curved bottom on the cylindrical outer surface of the spool, transverse to the spool but not extending around the spool. The edges of the groove or cut function as guide edges. In the example of FIG. 2, the narrowings 4a, 4c and 4d are annular narrowings, and the narrowing 4b is a planar narrowing, which is also shown in FIG. 6.

Figure 6:
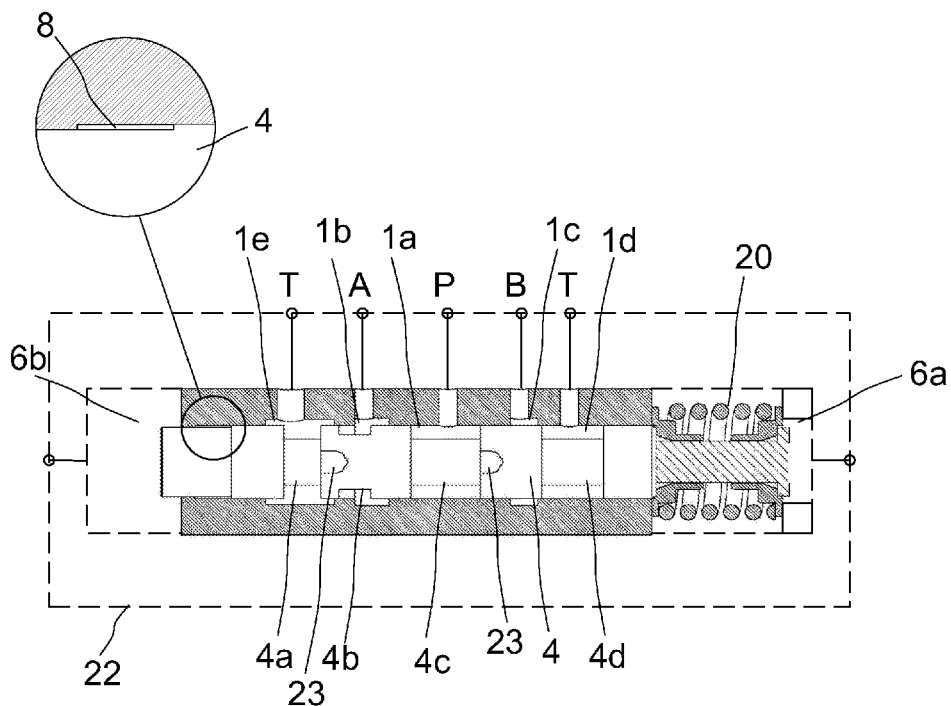
FIG. 6 shows a cross-sectional view of the directional valve of FIG. 2.

The valve of FIG. 6, and its position, correspond to the valve of FIG. 2 and its position, but the spool 4 is not shown in a cross-section. The narrowing 4b comprises two planar grooves placed on opposite sides of the spool 4. FIG. 6 shows the shaping of two guide edges, utilizing the groove 23. The groove 23 can be used to influence the way in which the cross-sectional area of the flow changes when the spool is moved from one position to another. By means of a planar narrowing, a shorter spool can be implemented, because the groove 23 can now be placed in parallel with the narrowing, as in FIG. 6.

The right edge of the narrowing 4b, and simultaneously also the left edge, are for the flow direction A-T, the left edge of the narrowing 4c is for the flow direction P-A, and the right edge of the narrowing 4c is for the flow direction P-B. The left edge of the narrowing 4d is for the flow direction B-T. Furthermore, the spool 4 can be provided with shapes that gradually change the cross-sectional area of the flow.

Each guide edge opens and closes said flow direction. The narrowing 4a is placed at the left tank port T, the narrowing 4b is placed at the work port A, the narrowing 4c is placed at the pressure port P, and the narrowing 4d is placed at the second tank port T, when the spool is in the position of FIG. 2. If necessary, each channel P, A, B, and T is also considered to comprise the respective chamber 1a, 1b, 1c, or 1d, when examining the layout of said narrowings, or later also the layout of the channels 7a, 7b and 7c.

In FIG. 2, the spool 4 is in a position in which the pressure port P, the work port A, the work port B, and the tank port T are closed. Consequently, the valve 22 is in the coupling position that corresponds to the coupling position of FIG. 1, which is the second one from the right. No pilot control pressure is connected.

The spool 4 is also provided with a benching that reduces the outer diameter of the spool and forms an annular surface area around the spool, which is subjected to a pressure that generates a force opposite to the force of the pilot control 6a (flow direction P-A). The benching is placed at the end of the spool 4 which, in turn, is placed in such a location in the sleeve that is provided with a benching that reduces the inner diameter of the sleeve and forms an annular surface area on the inner surface of the sleeve and simultaneously around the sleeve, the annular surface area also being subjected to said pressure. Because the sleeve is not movable, the spool 4 moves to the right by the effect of said pressure when the pressure increases sufficiently. Between the spool 4 and the sleeve, around the spool 4, a feedback chamber 8 is formed, delimited by said annular surface areas. Accurate fitting between the spool and the sleeve seals the feedback chamber 8. If there is no sleeve in the valve, a corresponding structure is formed as a bore in the valve body. By the selection of the size of the annular surface area, the generated force is influenced.

The spool 4 is provided with channels, for example by bores. For example, the spool 4 comprises a longitudinal bore extending from the end of the spool and being plugged. The spool 4 is provided with other bores which join the longitudinal bore and end on the cylindrical outer surface of the spool, for example radially. The first channel 7a is placed in the section between the narrowings 4b and 4c in the spool 4. The second channel 7b is placed next to the narrowing 4a, on the opposite side of the narrowing 4a with respect to the narrowing 4b. The third channel 7c connects the first and second channels 7a, 7b to each other and to the feedback chamber 8. The connection is implemented inside the spool 4.

In FIG. 2, the spool 4 is in a position in which the first channel 7a is closed, the second channel 7b is connected to the tank port T, and the third channel 7c is connected to the feedback chamber 8.

Furthermore, the valve 22 comprises a first pilot control chamber 6a for pilot control pressure. The force generated by the pilot control moves the spool 4 so that the flow is in the direction P-A-B-T. Furthermore, the valve 22 comprises a second pilot control chamber 6b for pilot control pressure. The force generated by the pilot control moves the spool 4 so that the flow is in the direction P-B-A-T. Each pilot control pressure generates a force effective on the end of the spool 4 and acting as a counterforce for the spring 20 that returns and centers the spool 4. In the center position of the valve 22, all the channels are closed, as shown in FIG. 1. The pilot control chambers 6a and 6b are placed at opposite ends of the spool 4, and moreover, only one centering spring 20 is used, placed at one end of the spool 4.

Alternatively, the valve 22 may be provided with a separate pilot control piston for generating a mechanical force effective on the spool 4. The pilot control chambers 6a and 7b are placed at opposite ends of the piston, at the same end of the spool, and the centering spring is placed at the opposite end.

Instead of a separate pilot control piston, it is also possible to use, for example, an annular surface area worked on the spool, for example a collar-like narrowing, which is subjected to the pilot control pressure. In FIG. 2, the pilot control pressure is effective directly on the end of the spool. In another example, the two springs needed (cf. springs 5a and 5b in FIG. 1) for centering the spool 4 are provided at opposite ends of the spool. In another example, instead of one or more different pilot control pressures, a member that generates a mechanical force is used, as described above.

The valve 22 may comprise one or several separate parts in which the pilot control piston, spring or pilot control chamber is placed. If necessary, said components can also be placed in the same body.

The directional valve shown in FIG. 2 operates as follows.

Figure 4:
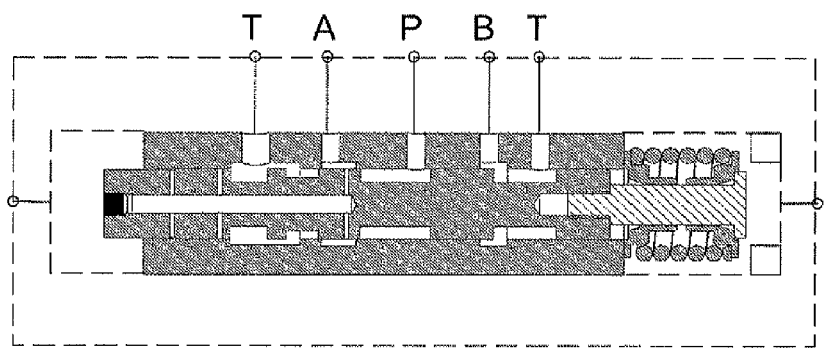
Figure 5:
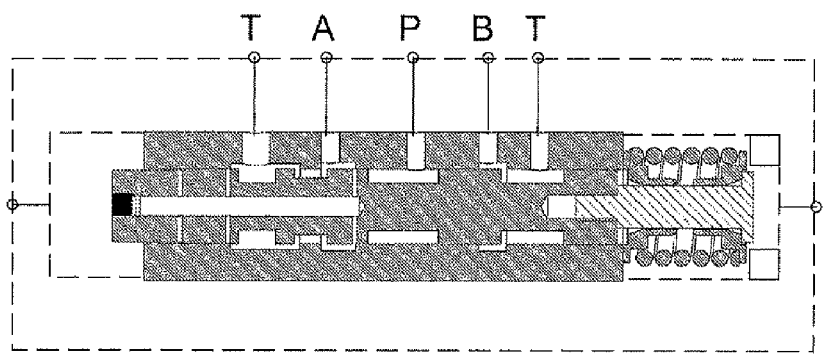

A special feature in the presented solution is that by selecting the force generated by the feedback chamber and the force of the pilot control, as well as the returning force, it is possible to define the pressure of the working chamber that corresponds to the desired force generated by the pilot control. Instead of the force of the pilot control, it is possible, if necessary, to define the predetermined pressure of the work port corresponding to the predetermined pressure of the pilot control. When the pressure rises to the level of the predetermined pressure, or higher than that, the pressure control functions of the valve are switched on, as shown in FIGS. 4 and 5.

The directional valve comprises the functions relating to the pressure control: pressure-reducing and pressure relief. The desired pressure difference between the pressure reducing and pressure relief can be varied by the selection of the surface areas of said feedback chamber or pilot control chamber, by the selection of the spring, and by the amount of lap of the spool. The spool comprises channels which couple the feedback chamber to either the tank port or a work port, or both of them, as desired.

Figure 3:
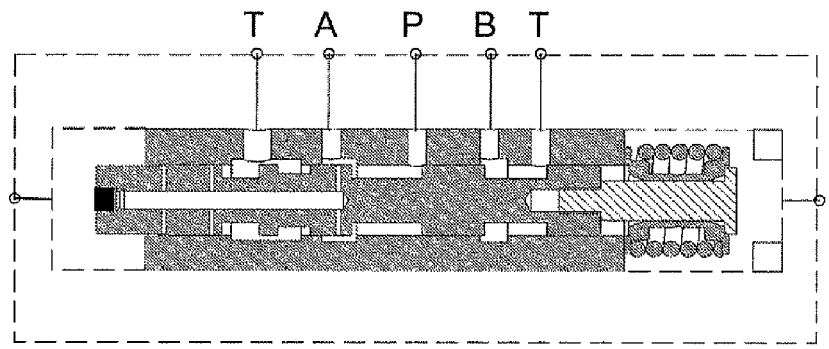
FIGS. 3, 4 and 5 show the operation of the directional valve of FIG. 2 in different positions of the spool.

As shown in FIG. 3, when a desired pilot control pressure has been raised in the first pilot control chamber 6a, the spool 4 opens in the flowing direction P-A-B-T and simultaneously moves to a balance position that is dependent on the spring 20, the force generated by the pilot control pressure, and the force generated by the pressure of the feedback chamber 8. A connection is provided between the feedback chamber 8 and the work port A, but there is no connection between the feedback chamber 8 and the tank port T. The pressure of the work port A prevails in the feedback chamber 8.

The narrowings 4a and 4b are now placed at the tank port T, the narrowing 4c is placed at both the work port A and the pressure port P, and the narrowing 4d is placed at both the work port B and the second tank port T, when the spool 4 is in the position of FIG. 3.

In FIG. 3, the spool 4 is in a position in which the first channel 7a is connected to the work port A and simultaneously also to the pressure port P, the second channel 7b is closed, and the third channel 7c is connected to the feedback chamber 8.

The spool 4 is in a position, in which there is a connection between the pressure port P and the work port A, and, at the same time, there is also a connection between the work port B and the tank port T. Consequently, the valve 22 is in the coupling position that corresponds to the coupling position on the left hand side of FIG. 1. The connection between the pressure port P and the work port B is closed, and also the connection between the work port A and the tank port T is closed. The shape and the narrowings of the spool are fitted so that the desired connections are either open or closed in the different coupling positions of the valve 22. The widths of the narrowings and the chambers are selected so that the desired cross-sectional area of the flow is formed in different situations.

In the situation of FIG. 3, the force generated by the pilot control (the pilot control chamber 6a) is greater than the combined forces generated by the spring 20 and the feedback chamber 8, wherein the flow in the direction P-A remains open. The pressure of the work port A is lower than in the situation of FIG. 4. The pressure of the work port A prevails in the feedback chamber 8.

In the situation of FIG. 4, the pressure of the work port A has risen so high that a balance situation is achieved with respect to the forces, wherein the spool 4 has returned to a position in which the connection from the pressure port P to the work port A has been closed, because the spool 4 has been moved by said forces. Consequently, a predetermined pressure has been achieved in the work port A, closing the work port A, and as a result, the force generated by the pilot control chamber 6a is equal to the combined forces generated by the spring 20 and the feedback chamber 8. A connection is still provided between the feedback chamber 8 and the work port A, but there is no connection between the feedback chamber 8 and the tank port T. By means of said function, the pressure of the work port A is limited to said predetermined pressure which is thus determined by the dimensions and measurements of the spool 4, the pilot control chamber 6a and the feedback chamber 8. The more detailed selection of the dimensions and measurements will depend on, for example, the pressure level and the volume flow, but in their selection, it is easy to rely on the targeted functional principle of the valve which is disclosed in this description.

The narrowings 4a and 4b are placed at the tank port T, the narrowing 4c is placed at the pressure port P only, and the narrowing 4d is placed at both the work port B and the second tank port T, when the spool 4 is in the position of FIG. 4.

In another example, in the situation of FIG. 4, e.g., the structure of the spool is configured so that the connection from the work port B to the tank port T has been closed.

As shown in FIG. 4, the spool 4 is in a position in which the first channel 7a is connected to the work port A, the second channel 7b is closed, and the third channel 7c is connected to the feedback chamber.

In the situation of FIG. 5, the pressure of the work port A has risen further, compared with the situation of FIG. 4. The pressure rise is a result from, for example, an increase in an external load effective on the actuator. Thus, with respect to the forces, a balance situation is achieved again, whereby the connection from the pressure port P to the work port A remains closed, because the spool has been moved by said forces further to the right. In particular, the increased pressure in the feedback chamber 8 is now capable of moving the spool further so that a connection is formed between the work port A and the tank port T. As a result, the pressure of the work port A is limited or reduced, when the connection to the tank port T is opened.

The narrowing 4a is placed at the tank port T, and the narrowing 4b is placed at both the tank port T and the work port A, so that there is a connection between the narrowings 4a and 4b. The narrowing 4c is placed at the pressure port P, and the narrowing 4d is placed at both the work port B and the second tank port T, when the spool 4 is in the position of FIG. 5.

In FIG. 5, the spool 4 is in a position in which the first channel 7a is being closed but is still in connection with the work port A, and the second channel 7b is closed. If the spool 4 moves further to open the flow direction A-T, the second channel 7b will open and first after that the first channel 7a will be closed. The third channel 7c is in connection with the feedback chamber 8 which, in turn, is connected via the first channel 7a to the work port A.

If the pressure of the work port A rises further compared with the situation of FIG. 5, the spool 4 will move and the connection from the feedback chamber 8 to the work port A will be closed (the first channel 7a) and, in a corresponding manner, the connection from the feedback chamber 8 to the tank port T will be opened (the second channel 7b). The opening of this last mentioned connection confines the movement of the spool 4, and the position of the second channel 7b determines the position in which the spool can be moved at its maximum when the pilot control 6a is in use and the pressure of the work port A is rising. At the same time, the aperture or cross-sectional area of the flow is determined, which prevails in the connection between the work port A and the tank port T in the flow direction A-T. Furthermore, the movement of the spool 4 to the centre position (the second coupling position from the right in FIG. 1) is prevented, in which position the work port A would be totally closed and would enable a continuing rise in the pressure.

In FIG. 4, the cylinder is extended when the flow is in the direction P-A. The lines of the cylinder can also be cross connected in such a way that the cylinder becomes shorter when the flow is in the direction P-A.

In the different coupling positions of FIGS. 1 to 5, particularly in the coupling positions in which the pressure port P is closed, other connections can also be implemented in the spool and in the valve. In particular, several work ports can be connected to the tank port T simultaneously.

An example of a 4/3 valve has been presented above, but also a 4/2 valve is feasible, which does not have e.g. the coupling position on right-hand side of FIG. 1, with the corresponding connections. In yet another example, the valve may be a 3/3 or 3/2 valve with, for example, a pressure port P a work port A and a tank port T. Thus, the structure corresponds e.g. to the principle of FIG. 1 or to the structure of FIG. 2, from which the work port B is missing or it is not in use. The work port A is either connected to the pressure port P, wherein the return flow from the actuator does not flow via the directional valve, or it is connected to the tank port T. As in the other valve examples, the interaction of the feedback force, the pilot control force and the returning force controls the operation of the valve for implementing the pressure control when the flow is guided to take place from the pressure port to a work port.

Figure 7:
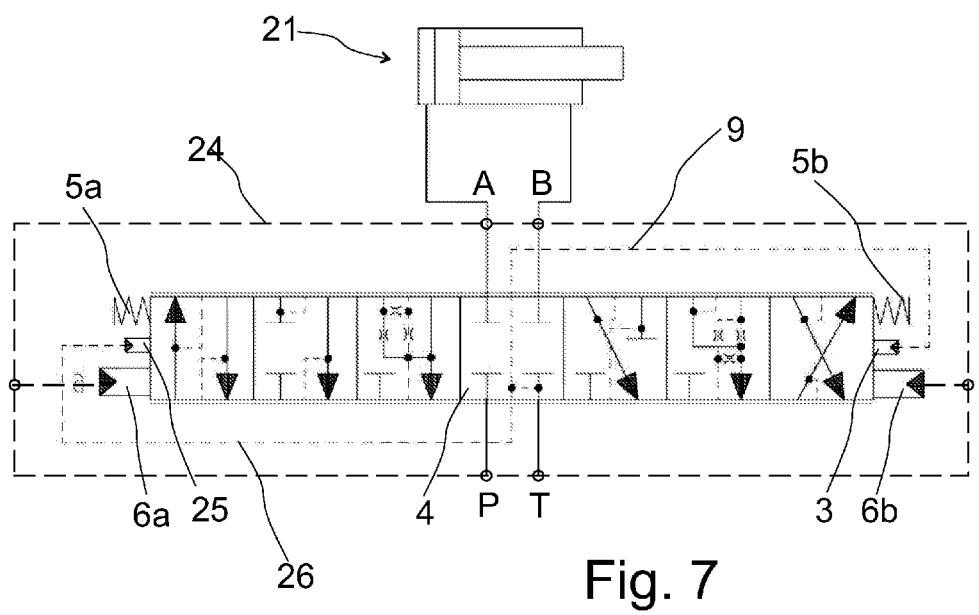
FIG. 7 shows another example of a directional valve according to the solution, illustrated with graphic symbols representing the principles of the different functions of the directional valve.

FIG. 7 shows, by means of graphic symbols of hydraulics and on the principle level, another directional valve in which the pressure control according to the presented solution is applied. In the valve 24, corresponding functions are implemented as in FIGS. 1 and 2, and also other functions, so that partly the same reference numerals have been used as in the valve 1 and the valve 22. Also in other respects, the same technical features have been implemented in the valve 24, its structures and functions, as in the valve 1 or 22.

FIG. 7 also shows feedback control 25 and a relating channel 26 which, in a desired way, transmits the pressure of the work port B and/or the pressure of the tank port T when the spool is in different coupling positions. The channel 26 is formed by channels corresponding to the channels 7a, 7b and 7c of FIG. 2, for example, and the control 25 is implemented with a corresponding feedback chamber as, for example, the feedback chamber 8 of FIG. 2.

In the above example shown in FIG. 1, the pressure control relates to the valve 1 only in the coupling position in which the pressure port P is connected to the work port A, and the tank port T is connected to the work port B (the left coupling position in FIG. 1). According to FIG. 7, corresponding functions of the pressure control can also be provided in the valve for the coupling position in which the pressure port P is connected to the work port B and the tank port T is connected to the work port A (the right-hand side coupling position in FIG. 1). Thus, the second end of the spool 4 is also provided with corresponding functions, a feedback chamber and channels, but these are for the work port B and, if necessary, the work port B is connected to the tank port T. The narrowings, measurements and dimensions of the spool 4 are selected to the suitable for the purpose. The tank port T on right-hand side of FIG. 2 cooperates with the work port B in a way that corresponds to the cooperation of the left-hand side tank port T with the work port A. The required other connections are shown in different coupling positions of FIG. 7 (the second and third coupling positions from the right are for the pressure control in the flow direction P-B, and the second and third coupling positions from the left are for the pressure control in the flow direction P-A).

The work port B supplies pressure e.g. to an actuator 21, and the work port A receives pressurized medium from the actuator. The spool 4 is moved by the pilot control force (pilot control 6b and corresponding pilot control chamber) so that the flow of pressurized medium from the pressure port P to the work port B is opened. In addition to the directional valve functions, the valve further comprises a second feedback chamber in which the pressure is fitted to generate a feedback force effective on the spool 4 and opposite to the pilot control force (pilot control 6b). The generated feedback force is proportional to the pressure of the work port B and moves the spool 4 to close the flow.

When the spool 4 is in said position but moved so that the flow of pressurized medium from the pressure port P to the work port B is closed, the valve 24 is fitted to generate a feedback force proportional to the pressure of the work port B. Furthermore, said feedback force moves the spool 4 which opens the flow of pressurized medium from the work port B to the tank port T.

The invention is not limited solely to the examples presented above, but it can be modified within the scope of the appended claims which present and cover different embodiments of the invention.

The invention claimed is:

1. A directional valve for controlling an actuator by means of pressurized medium, wherein the directional valve comprises:
    a pressure port for pressurized medium;
    a work port for supplying pressurized medium;
    a tank port for receiving returning pressurized medium; and
    a body and a spool adapted to move axially inside the body of the directional valve, wherein
    the spool comprises a first position, in which the spool tends to be set,
    the spool further comprises a second position, into which the spool can be moved by a pilot control force and in which the spool is adapted to open a flow of pressurized medium passing from the pressure port to the work port,
    the spool further comprises a first channel that is connected to the work port when the spool is in the second position, wherein the first channel is shut off when the spool is in the first position, and a second channel that is connected to the tank port when the spool is in the first position, wherein the second channel is shut off when the spool is in the second position,
    the directional valve further comprises a feedback chamber in which pressure of pressurized medium generates a feedback force effective on the spool and opposite to the pilot control force,
    the spool is further adapted, in its second position, to guide pressure of pressurized medium of the work port to the feedback chamber,
    the feedback chamber is, when the spool is in the second position, adapted to generate the feedback force proportional to the pressure of pressurized medium of the work port and moving the spool to shut off the flow of pressurized medium, and
    the feedback chamber is placed around the spool between the body and the spool, the feedback chamber is delimited by the spool having a benching with an annular surface area formed around the spool and by the body having a benching with an annular surface area formed on an inner surface of the body, and the pressure of pressurized medium of the feedback chamber is effective on the annular surface area of the spool to generate the feedback force.

2. The directional valve according to claim 1, wherein, when the spool is in the second position but moved so that the flow of pressurized medium from the pressure port to the work port is shut off, the directional valve is adapted to generate the feedback force proportional to the pressure of pressurized medium of the work port and moving the spool to open a flow of pressurized medium from the work port to the tank port.

3. The directional valve according to claim 1, wherein the directional valve further comprises a first pilot control adapted to generate the pilot control force.

4. The directional valve according to claim 1, wherein the directional valve further comprises one or more springs adapted to maintain a returning force tending to move the spool to the first position.

5. The directional valve according to claim 1, wherein the spool further comprises a third channel connecting the first and second channels to the feedback chamber.

6. The directional valve according to claim 1, wherein the first and second channels are fitted radially in the spool.

7. The directional valve according to claim 1, wherein the spool comprises first and second narrowings that are adjacent, the first narrowing moves at the tank port and the second narrowing moves from the work port to the tank port and back, and the first and second narrowings are placed between the first channel and the second channel in a direction of movement of the spool.

8. The directional valve according to claim 1, wherein the directional valve further comprises a second work port for receiving returning pressurized medium,
the spool in the first position is adapted to close the pressure port, the work port, the second work port, and the tank port, and
the spool in the second position is adapted to open a connection between the second work port and the tank port.

9. The directional valve according to claim 1, wherein the spool in the first position is adapted to close at least the pressure port.

10. The directional valve according to claim 1, wherein the directional valve further comprises a second work port for supplying pressurized medium, and the spool further comprises a third position, into which the spool can be moved by a pilot control force and in which the spool is adapted to open a connection between the pressure port and the second work port and to open a connection between the work port and the tank port.

11. The directional valve according to claim 1, wherein
the directional valve further comprises a second work port for supplying pressurized medium,
the spool further comprises a third position, into which the spool can be moved by a pilot control force and in which the spool is adapted to open a flow of pressurized medium passing from the pressure port to the second work port, and
the directional valve is, when the spool is in the third position, adapted to generate a second feedback force proportional to pressure of pressurized medium of the second work port and moving the spool to shut off the flow.

12. The directional valve according to claim 11, wherein, when the spool is in the third position but moved so that the flow of pressurized medium from the pressure port to the second work port is shut off, the directional valve is adapted to generate the second feedback force proportional to the pressure of pressurized medium of the second work port and moving the spool to open a flow of pressurized medium from the second work port to the tank port.

13. The directional valve according to claim 1, wherein the directional valve further comprises a first pilot control adapted to generate the pilot control force, and the first pilot control comprises a pilot control chamber having prevailing pressure effective directly on the spool.

14. A directional valve for controlling an actuator by means of pressurized medium, wherein the directional valve comprises:
a pressure port for pressurized medium;
a work port for supplying pressurized medium;
a second work port for receiving returning pressurized medium;
a tank port for receiving returning pressurized medium; and
a body and a spool adapted to move axially inside the body of the directional valve, wherein
the spool comprises a first position, in which the spool tends to be set, the spool in the first position being adapted to close the pressure port, the work port, the second work port, and the tank port,
the spool further comprises a second position, into which the spool can be moved by a pilot control force and in which the spool is adapted to open a flow of pressurized medium passing from the pressure port to the work port, the spool in the second position being adapted to open a connection between the second work port and the tank port,
the directional valve further comprises a feedback chamber in which pressure of pressurized medium generates a feedback force effective on the spool and opposite to the pilot control force,
the spool is further adapted, in its second position, to guide pressure of pressurized medium of the work port to the feedback chamber,
the feedback chamber is, when the spool is in the second position, adapted to generate the feedback force proportional to the pressure of pressurized medium of the work port and moving the spool to shut off the flow of pressurized medium, and
the feedback chamber is placed around the spool between the body and the spool, the feedback chamber is delimited by the spool having a benching with an annular surface area formed around the spool and by the body having a benching with an annular surface area formed on an inner surface of the body, and the pressure of pressurized medium of the feedback chamber is effective on the annular surface area of the spool to generate the feedback force.

15. A directional valve for controlling an actuator by means of pressurized medium, wherein the directional valve comprises:
a pressure port for pressurized medium;
a work port for supplying pressurized medium;
a second work port for supplying pressurized medium;
a tank port for receiving returning pressurized medium; and
a body and a spool adapted to move axially inside the body of the directional valve, wherein
the spool comprises a first position, in which the spool tends to be set,
the spool further comprises a second position, into which the spool can be moved by a pilot control force and in which the spool is adapted to open a flow of pressurized medium passing from the pressure port to the work port,
the spool further comprises a third position, into which the spool can be moved by a pilot control force and in which the spool is adapted to open a flow of pressurized medium passing from the pressure port to the second work port,
the directional valve further comprises a feedback chamber in which pressure of pressurized medium generates a feedback force effective on the spool and opposite to the pilot control force,
the spool is further adapted, in its second position, to guide pressure of pressurized medium of the work port to the feedback chamber,
the feedback chamber is, when the spool is in the second position, adapted to generate the feedback force proportional to the pressure of pressurized medium of the work port and moving the spool to shut off the flow of pressurized medium,
the feedback chamber is placed around the spool between the body and the spool, the feedback chamber is delimited by the spool having a benching with an annular surface area formed around the spool and by the body having a benching with an annular surface area formed on an inner surface of the body, and the pressure of pressurized medium of the feedback chamber is effective on the annular surface area of the spool to generate the feedback force, and
the directional valve is, when the spool is in the third position, adapted to generate a second feedback force proportional to pressure of pressurized medium of the second work port and moving the spool to shut off the flow.

16. The directional valve according to claim 15, wherein, when the spool is in the third position but moved so that the flow of pressurized medium from the pressure port to the second work port is shut off, the directional valve is adapted to generate the second feedback force proportional to the pressure of pressurized medium of the second work port and moving the spool to open a flow of pressurized medium from the second work port to the tank port.

* * * * *